United States Patent [19]
Stenger et al.

[11] Patent Number: 5,421,158
[45] Date of Patent: Jun. 6, 1995

[54] SEGMENTED CENTERBODY FOR A DOUBLE ANNULAR COMBUSTOR

[75] Inventors: Richard E. Stenger; Kenneth E. Monson, both of Cincinnati; Robert A. Frederick, West Chester; Madeleine E. Fessler, Cincinnati; Eugene N. Tuley, Hamilton, all of Ohio

[73] Assignee: General Electric Company, Cincinnati, Ohio

[21] Appl. No.: 326,889

[22] Filed: Oct. 21, 1994

[51] Int. Cl.⁶ ............................................. F23R 3/50
[52] U.S. Cl. .................................. 60/747; 60/756
[58] Field of Search ............... 60/752, 755, 756, 757, 60/758, 760, 747, 39.36

[56] References Cited

U.S. PATENT DOCUMENTS

| | | | |
|---|---|---|---|
| 5,285,635 | 2/1994 | Savelli et al. | 60/39.36 |
| 5,289,687 | 3/1994 | Kress et al. | 60/747 |
| 5,321,951 | 6/1994 | Falls et al. | 60/748 |

FOREIGN PATENT DOCUMENTS

564170  10/1993  European Pat. Off. ............. 60/747

*Primary Examiner*—Timothy S. Thorpe
*Attorney, Agent, or Firm*—Andrew C. Hess; David L. Narciso

[57] ABSTRACT

A double annular combustor having concentrically disposed inner and outer annular combustors is provided with inner and outer domes. A centerbody is disposed between the inner and outer domes and is constructed of a plurality of substantially rectangular segments positioned such that circumferential gaps between adjacent centerbody segments align alternatively with and between carburetors positioned in the inner and outer domes.

17 Claims, 6 Drawing Sheets

SEGMENTED CENTERBODY FOR A DOUBLE ANNULAR COMBUSTOR

BACKGROUND OF THE INVENTION

1. Field of the Invention

This invention relates generally to the combustion system of a gas turbine engine and, more particularly, to a double annular combustor having concentrically disposed inner and outer annular combustors with inner and outer domes and a centerbody disposed between the inner and outer domes constructed of a plurality of substantially rectangular segments positioned such that circumferential gaps between adjacent centerbody segments align alternatively with and between carburetors positioned in the inner and outer domes.

2. Description of Related Art

Efforts to reduce emissions in gas turbine engines have brought about the use of staged combustion techniques wherein one burner or set of burners is used for low speed, low temperature conditions such as idle, and another, or additional, burner or burners are used for high temperature operating conditions. One particular configuration of such a concept is that of the double annular combustor wherein the two stages are located concentrically in a single combustor liner. Conventionally, the pilot stage section is located concentrically outside and operates under low temperature and low fuel/air ratio conditions during engine idle operation. The main stage section, which is located concentrically inside, is later fueled and cross-ignited from the pilot stage to operate at the high temperature and relatively high fuel/air ratio conditions. The swirl cups of the respective pilot and main stage sections generally lie in the same radial and circumferential planes, as exemplified by U.S. Pat. No. 4,292,801 to Wilkes, et al. and U.S. Pat. Nos. 4,374,466 and 4,249,373 to Sotheran.

However, as discussed in a development report to the National Aeronautics and Space Administration (NASA) on combustion system component technology for the Energy Efficient Engine ($E^3$) and U.S. Pat. No. 4,194,358 to Stenger, the pilot stage and the main stage may be radially offset (i.e., lie in distinct radial planes). In both the '358 patent and $E^3$ configurations, the effective length of the main stage section is relatively short and the effective length of the pilot stage section is relatively long. This configuration allows for complete or near-complete combustion to reduce the amount of hydrocarbon and carbon monoxide emissions since there is a relatively long residence time in the pilot stage section and a relatively minimal residence time in the main stage section.

Whether the inner and outer combustors are radially aligned or not, and whether the outer annular combustor acts as the pilot stage or main stage, the prior art discloses the use of a centerbody to isolate the pilot and main stages. The intended purpose of isolating the pilot stage from the main stage is to ensure combustion stability of the pilot stage and lower gaseous emissions at various operating points.

Combustor centerbodies generally have been a continuous ring fabricated from forged or rolled rings and sheet material. This one-piece design, however, is difficult to manufacture due to tight size and form tolerance requirements for fabrication and assembly. Further, the difference in temperature between the combustor structure and the centerbody, as well as between individual points within the centerbody structure, generate large hoop stresses and associated forces at the point of attachment. Another problem with one-piece centerbodies is the effect on the entire piece caused by a local problem. For example, the entire centerbody is depressurized in the event of a local burn-through due to the resulting leakage. Also, if one area of the centerbody is damaged the entire piece must be repaired or replaced.

It is also understood that replacement of a one-piece centerbody with a centerbody having a plurality of segments introduces other considerations. In particular, freedom of movement for such segments is required during various staging modes of a double annular combustor since each centerbody segment experiences an axial thermal gradient from the relatively cold upstream end and the hot downstream end, as well as a circumferential thermal gradient from one side to the other due to inherent hot streaks from the fuel nozzles positioned within the carburetors. Therefore, such thermal gradients must be accounted for in addition to the radial thermal gradients already present on one-piece centerbodies. Accordingly, a combustor centerbody having a plurality of segments is needed that eliminates the problems associated with one-piece centerbodies and accounts for the radial, axial and circumferential thermal gradients which arise therefrom.

SUMMARY OF THE INVENTION

A double annular combustor having concentrically disposed inner and outer annular combustors is provided with inner and outer domes. A centerbody is disposed between the inner and outer domes and is constructed of a plurality of substantially rectangular segments positioned such that circumferential gaps between adjacent centerbody segments align alternatively with and between carburetors positioned in the inner and outer domes.

BRIEF DESCRIPTION OF THE DRAWINGS

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
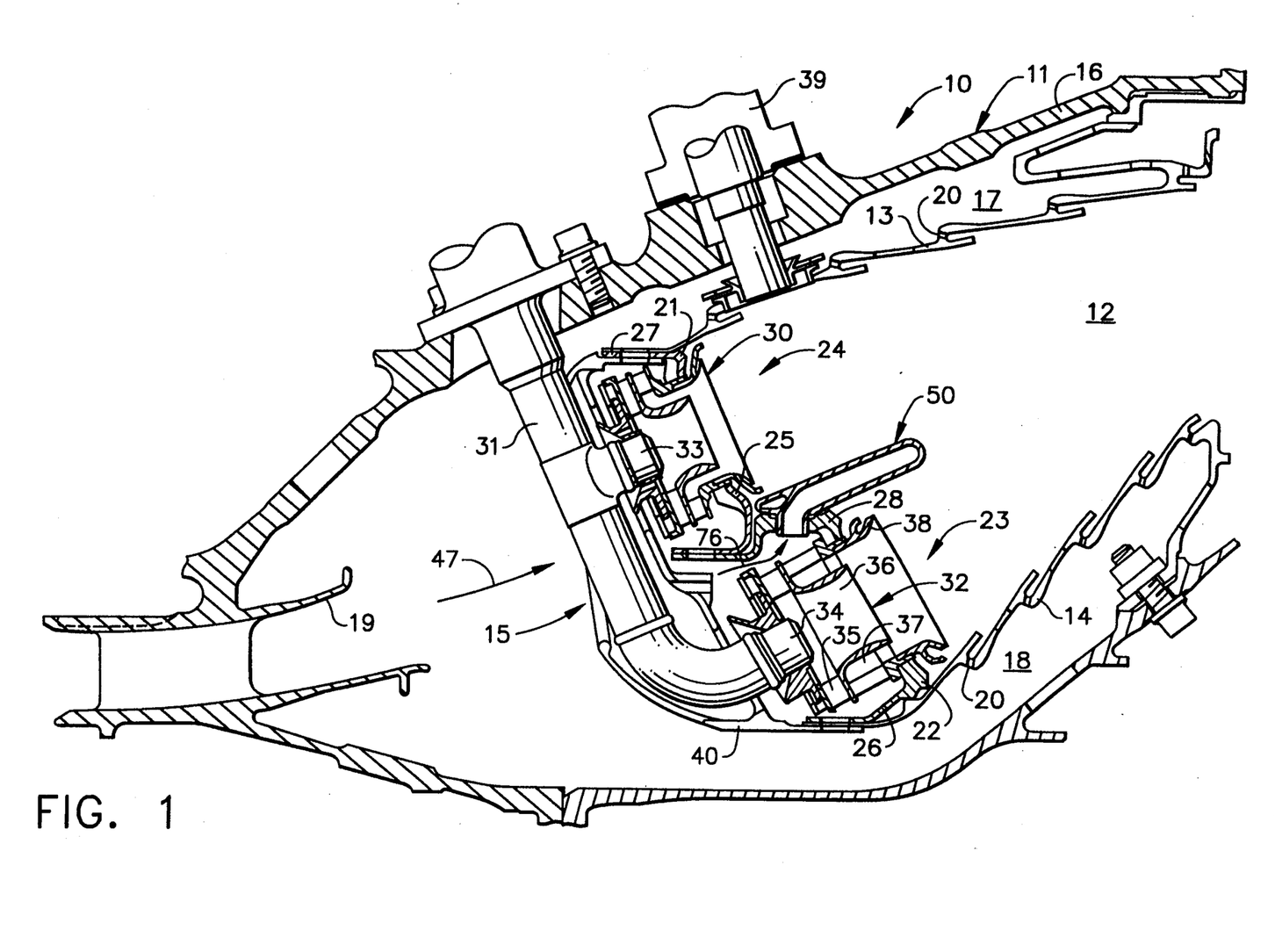
FIG. 1 is a transverse cross-sectional view of a double annular combustor including a centerbody of the present invention.
Figure 2:
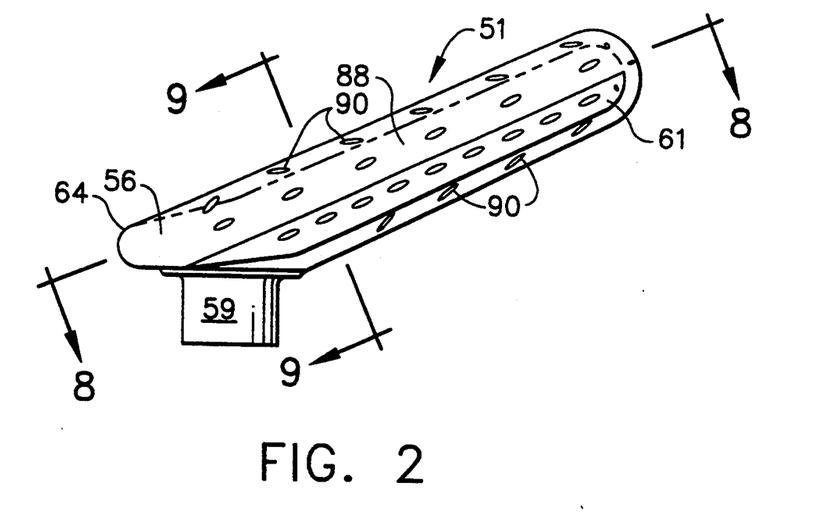
FIG. 2 is a left side view of a single segment of the centerbody of FIG. 1.

Referring now to the drawings in detail, wherein identical numerals indicate the same elements throughout the figures, FIG. 1 depicts a continuous-burning combustion apparatus 10 of the type suitable for use in a gas turbine engine and comprising a hollow body 11 defining a combustion chamber 12 therein. Hollow body 11 is generally annular in form and is comprised of an outer liner 13 and an inner liner 14. At the upstream end of the hollow body 11 is a series of openings 15 for the introduction of air and fuel in a preferred manner as will be described hereinafter.

The hollow body 11 may be enclosed by a suitable shell 16 which, together with liners 13 and 14, defines outer passage 17 and inner passage 18, respectively, which are adapted to deliver in a downstream flow the pressurized air from a suitable source such as a compressor (not shown) and a diffuser 19. The compressed air from diffuser 19 passes principally into annular opening 15 to support combustion and partially to passages 17 and 18, where it is used to cool liners 13 and 14, supply dilution flow to combustion chamber 12 by way of a plurality of apertures 20, and cool the turbomachinery further downstream.

Disposed between and interconnecting outer and inner liners 13 and 14 near their upstream ends are outer and inner domes 21 and 22, respectively, which preferably are separate and distinct dome plates attached to the liners by way of bolts, brazing or the like. Outer and inner dome plates 21 and 22 each have inner portions 25 and 26 and outer portions 27 and 28, respectively. Accordingly, outer dome plate outer portion 27 is connected to outer liner 13 and inner dome plate inner portion 26 is connected to inner liner 14. Outer dome inner portion 25 is connected to inner dome outer portion 28 as described hereinafter.

Dome plates 21 and 22 are arranged in a so-called "double annular" configuration wherein the two form the forward boundaries of separate, radially spaced, annular combustors which act somewhat independently as separate combustors during various staging operations. For purposes of description, these annular combustors will be referred to as inner annular combustor (main stage section) 23 and outer annular combustor (pilot stage section) 24, and will be more fully described hereinafter.

Located between inner annular combustor 23 and outer annular combustor 24 in the preferred embodiment of FIG. 1 is a centerbody 50 which acts to separate and partially define the common boundary between inner and outer annular combustors 23 and 24, respectively. Centerbody 50 conducts the flow of air rearwardly to restrain the combustive gases of outer annular combustor 24 from entering inner annular combustor 23. As will be seen in FIG. 3, centerbody 50 preferably is divided into a plurality of segments 51 having substantially equal circumferential length. It should be noted that each segment 51 of centerbody 50 preferably is substantially rectangular in shape and optimally is a square (see FIGS. 5 and 6), whereby the thermal gradients experienced by centerbody segments 51 in the axial and circumferential directions can be best accommodated.

Figure 3:
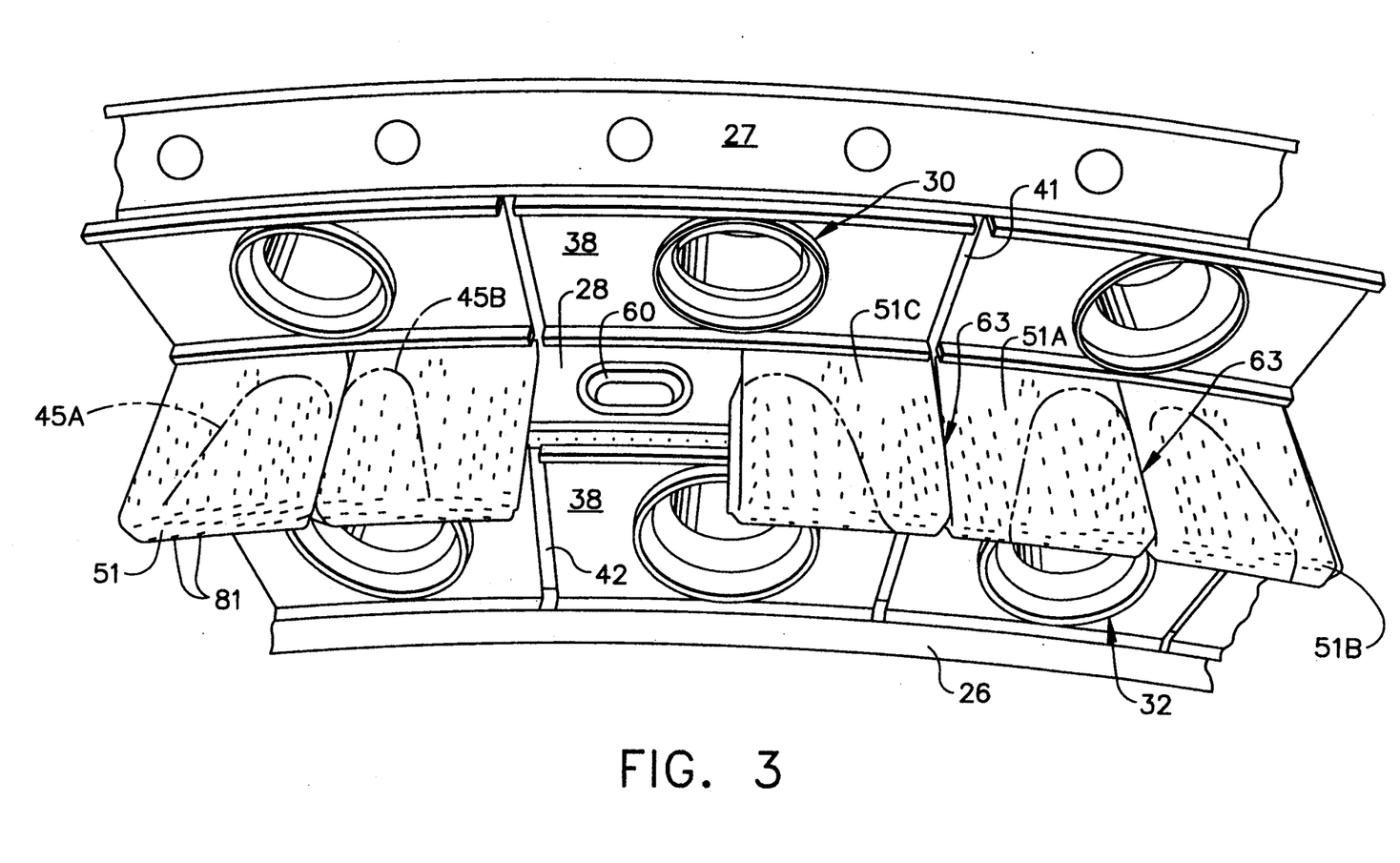
FIG. 3 is a partial aft perspective view of the combustor dome area of FIG. 1, where one of the centerbody segments has been removed for clarity.
Figure 3A:
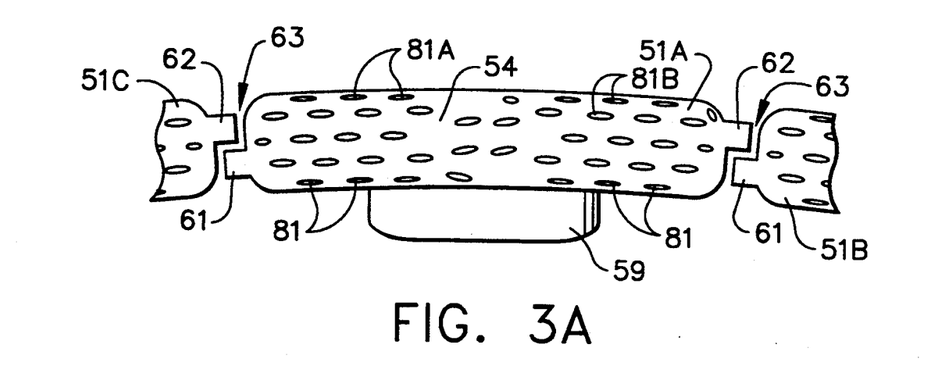
FIG. 3A is a partial aft view of the centerbody as configured in FIGS. 1 and 3.
Figure 4:
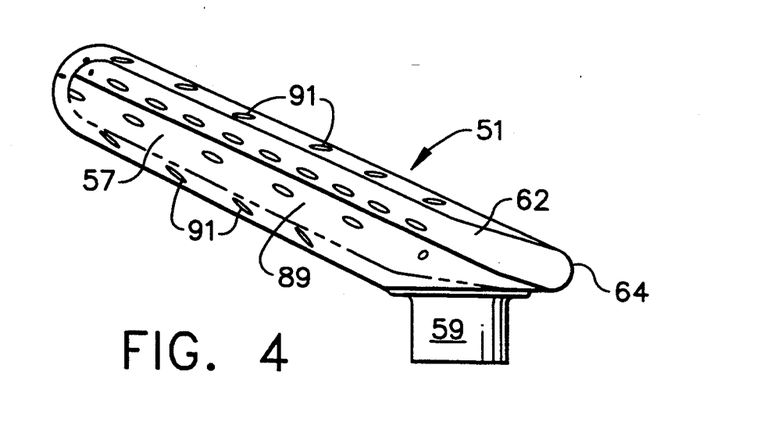
FIG. 4 is a right side view of a single segment of the centerbody of FIG. 1.

In order to compensate for hot streaks (the outline of which is depicted by dotted lines 45A and 45B in FIG. 3) produced by fuel nozzles 33 and 34 which are retained in the upstream end of and in line with carburetors 30 and 32 of outer and inner annular combustors 24 and 23, respectively, it is preferred that adjacent centerbody segments, such as segments 51A and 51B, have a circumferential gap 63 (see FIG. 3A) therebetween which aligns with carburetors 30 and 32. It will also be seen that since two centerbody segments 51 are provided for each carburetor 30 and 32, adjacent centerbody segments, such as segments 51A and 51C, also have a circumferential gap 63 therebetween which aligns with radial channels 41 and 42 between adjacent splashplates 38. In this way, it will be understood that such a hot streak 45 is encountered over the immediate areas of centerbody segments 51A and 51B with a corresponding cold streak encountered by the remote areas of centerbody segments 51A and 51B which are not in alignment with carburetors 30 and 32 (such as the area of centerbody segment 51A adjacent centerbody segment 51C). This results in a thermal distortion pattern over centerbody segments 51A and 51B which can be accommodated by one side (the hot side) thereof growing slightly larger than the other side (the cold side).

More specifically, each centerbody segment 51 has an outer radial wall 52, an inner radial wall 53 spaced radially inward from outer radial wall 52, a downstream wall 54 connecting the downstream ends of outer and inner radial walls 52 and 53, an upstream wall 55 connecting the upstream ends of outer and inner radial walls 52 and 53, and a pair of side walls 56 and 57 connecting the side edges of outer and inner radial walls 52 and 53. Accordingly, an internal space 58 is defined within each centerbody segment 51.

As seen in FIG. 1, each segment 51 of centerbody 50 preferably is connected to inner dome outer portion 28 by means of a stem 59 which extends from upstream wall 55. Stem 59 extends into a channel 60 (see FIG. 3) in inner dome outer portion 28 and preferably is brazed thereto. Alternatively, segments 51 may be bolted to inner dome outer portion 28 with stem 59 positioned in an opening therein. It will be understood that stem 59 is hollow, allowing it to function as an inlet for a portion of the air entering openings 15 to flow into internal space 58 of centerbody segment 51.

It will also be seen from FIGS. 2–6 that centerbody segments 51 include a first flange 61 that extends externally from a lower portion of side wall 56 and a second flange 62 that extends externally from an upper portion of side wall 57. Flanges 61 and 62, also known as "wings," are utilized to minimize air flow through circumferential gaps 63 between adjacent centerbody segments 51 and consequently between outer annular combustor 24 and annular combustor 23 (see FIG. 3A).

With respect to the fit between centerbody 50 and outer and inner dome plates 21 and 22, it will be noted that outer dome plate inner portion 25 has a first section that is brazed to carburetor 30 at one end and extends substantially downstream to a second section which extends substantially radially inward, and thereafter to a third section which extends substantially upstream. The second section of outer dome plate inner portion 25 lies adjacent to an upstream edge 64 of outer radial wall 52 of centerbody segments 51. Inner dome plate outer portion 28 includes a first section which is brazed to carburetor 32 at one end and extends substantially upstream adjacent to upstream wall 55 of centerbody segments 51. Thereafter, a second section of inner dome plate outer portion 28 extends radially inward adjacent the second section of outer dome plate inner portion 25, and a third section of inner dome plate outer portion 28 lies substantially parallel to the third section of outer dome plate inner portion 25 with the respective third sections preferably connected by means of brazing (although a bolt may be utilized). In this way, outer dome plate inner portion 25 and inner dome plate outer portion 28 are connected.

Figure 8:
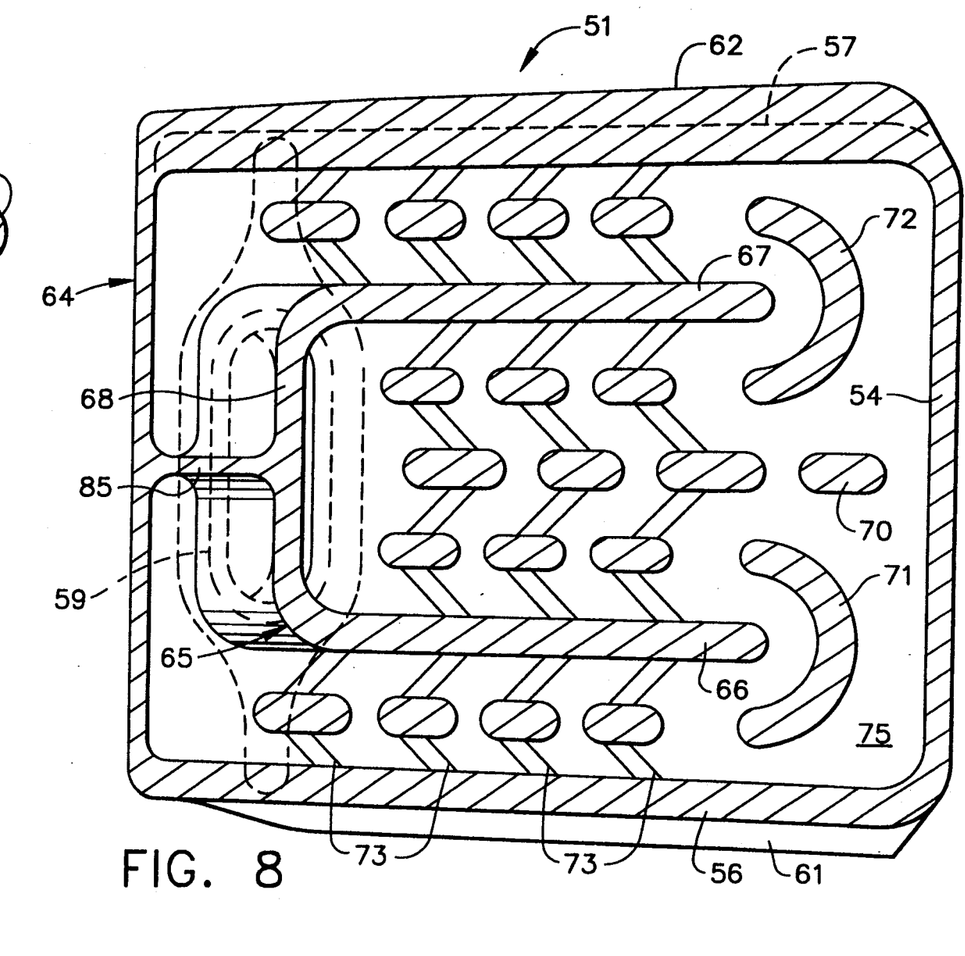
FIG. 8 is a cross-sectional view of the centerbody segment taken along line 8—8 in FIG. 2.
Figure 8A:
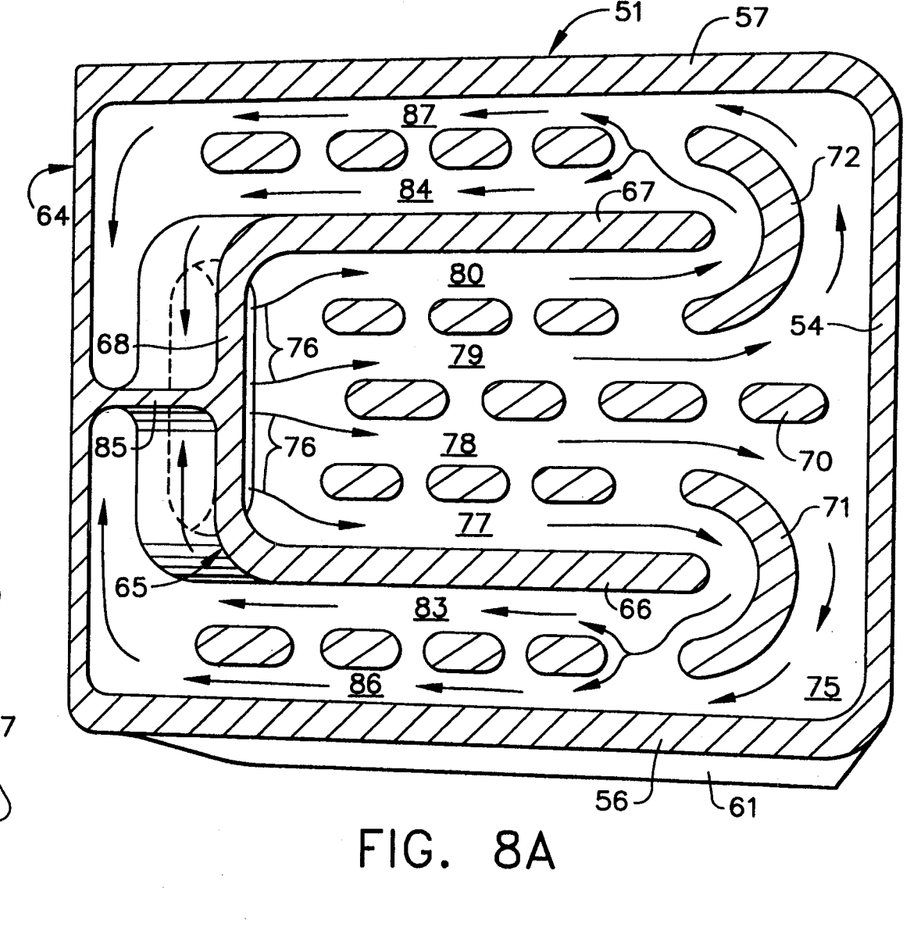
FIG. 8A is the same view of the centerbody segment of FIG. 8, wherein the stem and turbulators have been omitted to better show the pattern of air flow therethrough.
Figure 9:
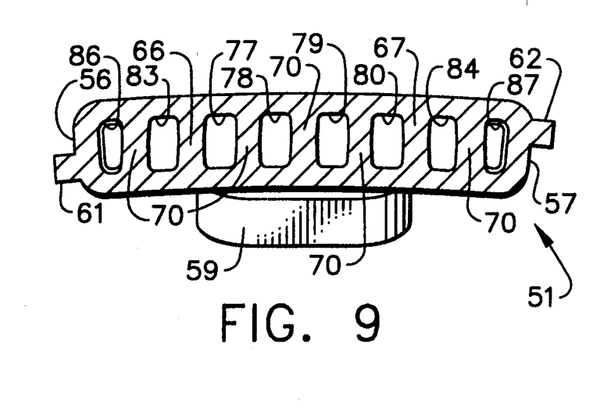
FIG. 9 is a cross-sectional view of the centerbody segment taken along line 9—9 in FIG. 2.

It will be understood that centerbody segments 51 are cooled by a combination of internal convection, conduction, and film. In particular, as best seen in FIGS. 8 and 8A, each centerbody segment 51 includes a substantially U-shaped internal wall 65 which is positioned within internal space 58 and extends radially between outer and inner radial walls 52 and 53. U-shaped internal wall 65 includes a first portion 66 which extends axially from an upstream end of centerbody segment 51 toward a downstream end, and is positioned toward and substantially parallel to side wall 56. A second portion 67 of U-shaped internal wall 65 extends axially from an upstream end of centerbody segment 51 toward a downstream end, and is positioned toward and substantially parallel to side wall 57. It will also be seen that first portion 66 and second portion 67 of U-shaped internal wall 65 preferably are substantially parallel to each other and have substantially the same axial length. A third portion 68 of U-shaped internal wall 65 serves to connect first and second portions 66 and 67 at the upstream end.

Further, a plurality of support columns 70 are interspersed within internal space 58 of centerbody segments 51 which extend radially between inner and outer radial walls 53 and 52. Support columns 70 not only conduct heat between outer and inner radial walls 52 and 53, but, with U-shaped internal wall 65, form passages through internal space 58 to provide a pattern of air flow therethrough. A first arcuate wall 71 and a second arcuate wall 72 are positioned adjacent the downstream ends of first and second portions 66 and 67, respectively, of U-shaped internal wall 65 in order to turn the flow of air. Also, a plurality of turbulators 73 are provided on an internal surface 75 of inner radial wall 53 in order to enhance flow.

With respect to the particular flow pattern within internal space 58 of centerbody segments 51, it is seen in FIGS. 8 and 8A that stem 59 opens downstream of third portion 68 of U-shaped internal wall 65 and air 76 flowing through stem 59 enters a series of passages 77, 78, 79 and 80 formed by support columns 70 and U-shaped internal wall 65. Air 76 flows downstream, with the portion flowing through middle passages 78 and 79 flowing to downstream wall 54 and out a plurality of angled holes 81 therein to film cool an outer surface 82 thereof (see FIG. 3A). It will be noted that angled holes 81 are preferably oriented substantially transverse to downstream wall 54, with angled holes 81A being angled toward side wall 56 and angled holes 81B being angled toward side wall 57.

The portions of air 76 flowing through outer passages 77 and 80 likewise flow downstream but encounter first and second arcuate walls 71 and 72, respectively, whereupon the air is turned back upstream. As seen by the arrows in FIG. 8A, the air flow is split between passages 84 and 87 on one side and passages 83 and 86 on the other side. This air flows upstream until it encounters a wall 85 which extends axially between upstream edge 64 and third portion 68 of U-shaped internal wall 65. The air flowing through passages 86 and 87 is then utilized to film cool outer surfaces 88 and 89 of side walls 56 and 57, respectively, by means of a plurality of angled holes 90 and 91 therein oriented downstream (see FIGS. 2 and 4).

Figure 5:
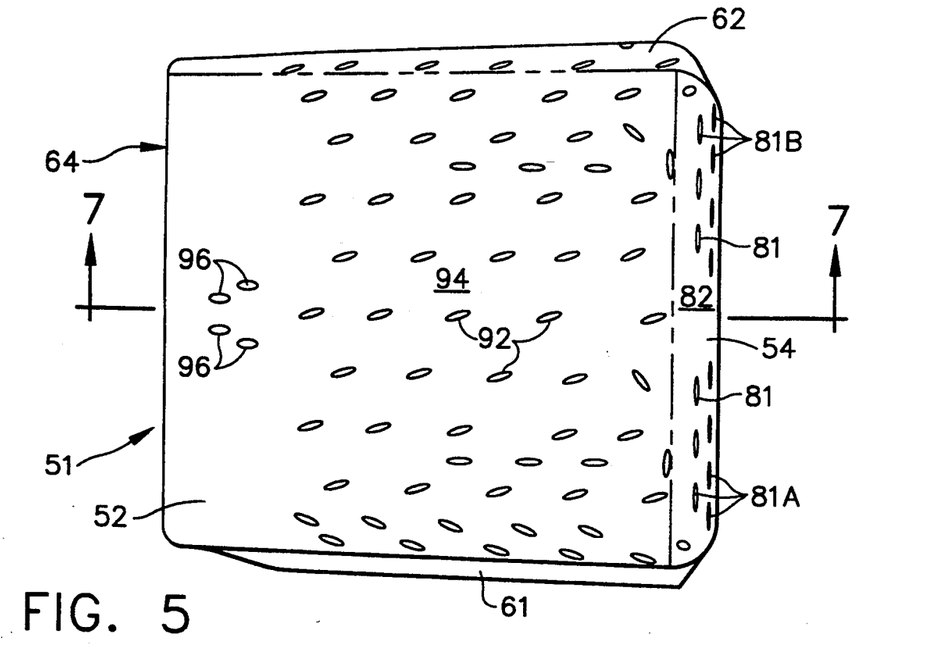
FIG. 5 is a top view of the single centerbody segment of FIGS. 2 and 4.
Figure 6:
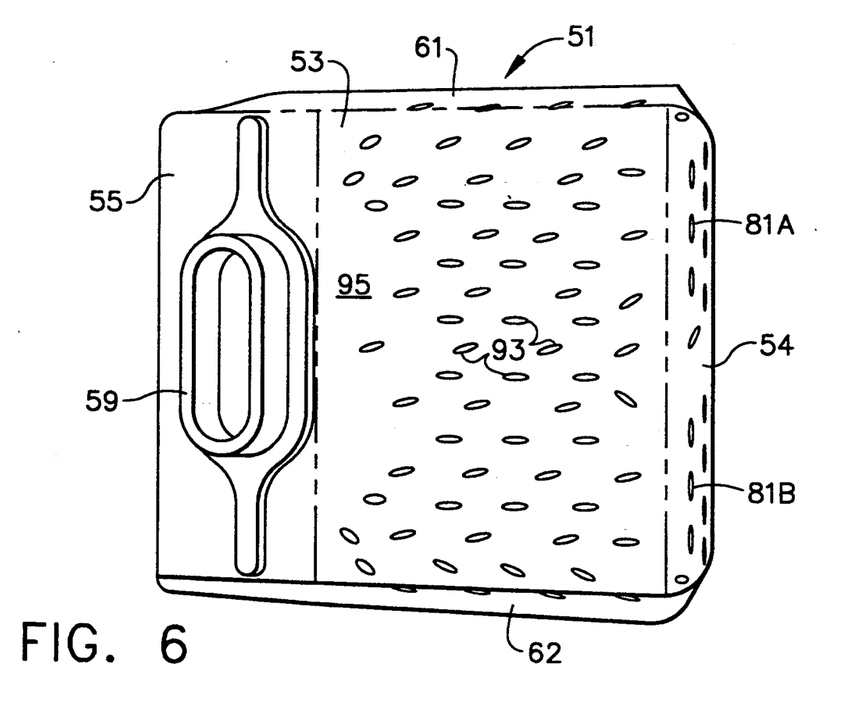
FIG. 6 is a bottom view of the single centerbody segment depicted in FIG. 5.
Figure 7:
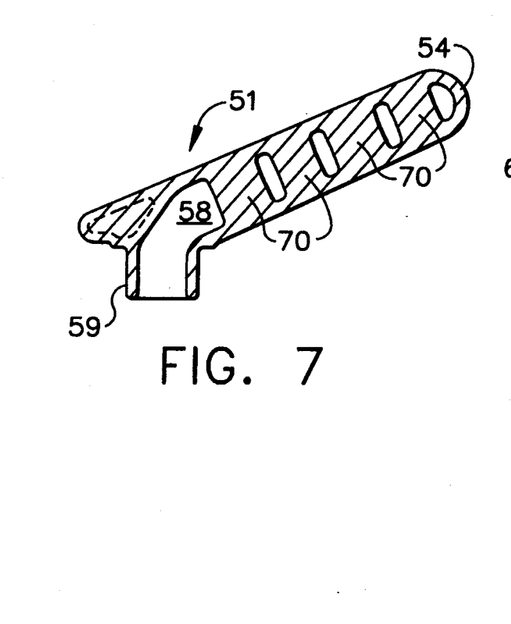
FIG. 7 is a cross-sectional view of the centerbody segment taken along line 7—7 of FIG. 5.

It will also be seen from FIGS. 5 and 6 that outer and inner radial walls 52 and 53 also have a plurality of angled holes 92 and 93 oriented downstream, respectively, for film cooling outer surfaces 94 and 95 thereof. A number of other larger angled holes 96 oriented upstream are also provided at the upstream end of outer radial wall 52 and located to each side of wall 85, where the air encountering wall 85 is directed outward through holes 96.

As indicated by the arrows in FIG. 8A, air flows through passages 77, 80, 83, 84, 86 and 87 in a circuitous path through internal space 58, whereby internal convection cooling of centerbody segments 51 takes place and a supply of air for film cooling outer and inner radial walls 52 and 53 and side walls 56 and 57 is provided.

Disposed in outer annular combustor 24 is a plurality of circumferentially spaced carburetor devices 30 with their axes being coincident with that of outer annular combustor 24 and aligned substantially with outer liner 13 to present an annular combustor profile which is substantially straight. It should be understood that carburetor device 30 can be of any of various designs which acts to mix or carburet the fuel and air for introduction into combustion chamber 12. One design might be that shown and described in U.S. Pat. No. 4,070,826, entitled "Low Pressure Fuel Injection System," by Stenger et al, and assigned to the assignee of the present invention. In general, carburetor device 30 receives fuel from a fuel tube 31 through fuel nozzle 33 and air from annular opening 15, with the fuel being atomized by the flow of air to present an atomized mist of fuel to combustion chamber 12.

In a manner similar to outer annular combustor 24, inner annular combustor 23 includes a plurality of circumferentially spaced carburetor devices 32 whose axes are aligned substantially parallel to the axis of carburetor device 30. Carburetor devices 32, together with inner dome plate 22, inner liner 14 and centerbody 50 define inner annular combustor 23 which may be operated substantially independently from outer annular combustor 24 as mentioned hereinabove. Once again, the specific type and structure of carburetor device 32 is not important to the present invention, but should preferably be optimized for efficiency and low emissions performance. For description purposes only, and except for considerably higher airflow capacity, carburetor device 32 is identical to carburetor device 30 and includes a fuel nozzle 34 connected to fuel tube 31 for introducing fuel which is atomized by high pressure or introduced in a liquid state at a low pressure. A primary swirler 35 receives air to interact with the fuel and swirl it into venturi 36. A secondary swirler 37 then acts to present a swirl of air in the opposite direction so as to interact with the fuel/air mixture to further atomize the mixture and cause it to flow into combustion chamber 12. A flared splashplate 38, which preferably is integral with the swirl cup, is employed at the downstream end of carburetor device 32 so as to prevent excessive dispersion of the fuel/air mixture. An igniter 39 is installed in outer liner 13 so as to provide ignition capability to outer annular combustor 24.

A cowl 40 is provided in order to stabilize the dome structure, as well as to protect carburetor devices 30 and 32. Cowl 40 is designed so that fuel tube 31 may fit snugly adjacent thereto. Cowl 40 is not a part of the presently claimed invention, but is the subject of a separate patent (U.S. Pat. No. 5,289,687) by the assignee of the present invention, and is hereby incorporated by reference.

Considering now the operation of the above-described double annular combustor, outer annular combustor 24 and inner annular combustor 23 may be used individually or in combination to provide the desired combustion condition. Preferably, outer annular combustor 24 is used by itself for starting and low speed conditions and will be referred to as the pilot stage. The inner annular combustor 23 is used at higher speed, higher temperature conditions and will be referred to as the main stage combustor. Upon starting the engine and for idle condition operation, carburetor devices 30 are fueled by way of fuel tubes 31 through fuel nozzles 33, and pilot stage 24 is ignited by way of igniter 39. The air from diffuser 19 will flow as shown by arrow 47, both through active carburetor devices 30 and through inactive carburetor devices 32. During these idle conditions, wherein both the temperatures and airflow are relatively low, pilot stage 24 operates over a relatively narrow fuel/air ratio band and outer liner 13, which is in the direct axial line of carburetor devices 30, will see only narrow excursions in relatively cool temperature levels. This will allow the cooling flow distribution in apertures 20 to be maintained at a minimum. Further, because outer annular combustor 24 and inner annular combustor 23 lie in distinct axial planes, pilot stage 24 is relatively long as compared with main stage 23 and the residence time will preferably be relatively long to thereby minimize the amount of hydrocarbon and carbon monoxide emissions.

As the engine speed increases, fuel is introduced by fuel tube 31 into carburetor devices 32 through fuel nozzles 34 so as to activate main stage 23. During such higher speed operation, pilot stage 24 remains in operation but main stage 23 consumes the majority of the fuel and the air. It will be recognized that main stage 23 is axially short in length when compared with pilot stage 24 due to the axial offset therebetween, whereby the residence time will be relatively short to reduce the $NO_x$ emissions.

It will be understood that the present invention has been described in terms of particular embodiments, but may take on any number of forms while remaining within the scope and intent of the invention. For example, it will be recognized that the present invention would be applicable to any double annular combustor, whether the inner and outer annular combustors lie in distinct radial and circumferential planes or not, as well as combustors having more than two separate annular combustors. Also, while FIG. 1 shows centerbody 50 to be connected to inner dome plate 22, it could just as well be connected to outer dome plate 21.

Having thus described the invention, what is claimed as novel and desired to be secured by Letters Patent of the United States is:

1. A double annular combustor having concentrically disposed inner and outer annular combustors, comprising:
   (a) an inner dome having a plurality of carburetors positioned therein;
   (b) an outer dome having a plurality of carburetors positioned therein, said outer dome being attached to said inner dome; and
   (c) a centerbody disposed between said inner dome and said outer dome, said centerbody further comprising a plurality of segments having an upstream end adjacent said inner and outer domes and a downstream end downstream of said upstream end, each of said centerbody segments including a first flange extending circumferentially from a radially upper exterior portion of a first side and a second flange extending circumferentially from a radially lower exterior portion of a second side, wherein a gap is defined between each adjacent centerbody segment by said first flange of one centerbody segment and said second flange of an adjacent centerbody segment, whereby thermal expansion of said centerbody is permitted.

2. The double annular combustor of claim 1, wherein said centerbody segments are substantially square when viewed radially.

3. The double annular combustor of claim 1, further comprising a plurality of fuel nozzles associated with said carburetors of said inner and outer domes, wherein said centerbody segments are circumferentially positioned such that said gaps between adjacent centerbody segments align radially with and between each of said inner and outer dome carburetors in alternating fashion.

4. The double annular combustor of claim 1, each of said centerbody segments including a stem for attachment to said inner dome.

5. The double annular combustor of claim 4, wherein said stem is brazed to an opening in said inner dome.

6. The double annular combustor of claim 1, each of said centerbody segments being hollow and further comprising:
   (a) an outer radial wall;
   (b) an inner radial wall;
   (c) a downstream wall connecting said outer and inner radial walls at said downstream end;
   (d) an upstream wall connecting said outer and inner radial walls at said upstream end; and
   (e) a pair of side walls connecting said outer and inner radial Walls at each side thereof, said first and second flanges extending circumferentially therefrom.

7. The double annular combustor of claim 6, wherein said outer and inner radial walls are substantially square in shape.

8. The double annular combustor of claim 6, said centerbody segments further comprising a hollow stem connected at one end to an opening in said centerbody segment upstream wall, wherein said stem permits a flow of air to enter said centerbody segments.

9. The double annular combustor of claim 8, said counterbody segments including a plurality of spaced support columns and walls extending radially from said outer radial wall to said inner radial wall, said support columns and walls being arranged such that air entering said centerbody segments is caused to flow in a circuitous path therethrough.

10. The double annular combustor of claim 8, said centerbody segments including a plurality of angled holes in said outer radial wall for film cooling an outer surface thereof.

11. The double annular combustor of claim 8, said centerbody segments including a plurality of angled holes in said inner radial wall for film cooling an outer surface thereof.

12. The double annular combustor of claim 8, said centerbody segments including a plurality of angled holes in said downstream wall for film cooling an outer surface thereof.

13. The double annular combustor of claim 8, said centerbody segments including a plurality of angled holes in each of said side walls for film cooling an outer surface thereof.

14. The double annular combustor of claim 9, further including a plurality of turbulators positioned on an inside surface of said inner radial wall.

15. The double annular combustor of claim 6, each of said centerbody segments further comprising:
  (a) a substantially U-shaped internal wall extending radially between said outer and inner radial walls, said U-shaped internal wall including a first portion which extends axially along said centerbody segment, a second portion which extends axially along said centerbody segment substantially parallel to said first portion, and a third portion which connects said first and second portions along an upstream end of said centerbody segment;
  (b) a first internal arcuate wall located adjacent to a downstream end of said U-shaped wall first portion;
  (c) a second internal arcuate wall located adjacent to a downstream end of said U-shaped wall second portion; and
  (d) a plurality of support columns extending radially between said outer and inner radial walls which are oriented with said U-shaped wall, said first and second arcuate walls, and each other so as to form a plurality of passages through said centerbody segments.

16. The double annular combustor of claim 15, said centerbody segments further including a plurality of angled holes in an upstream portion of said outer radial wall, wherein air flowing through said passages exits said centerbody segment.

17. The double annular combustor of claim 1, wherein said gap has a circumferential portion and a radial portion.

* * * * *